Patented Dec. 23, 1941

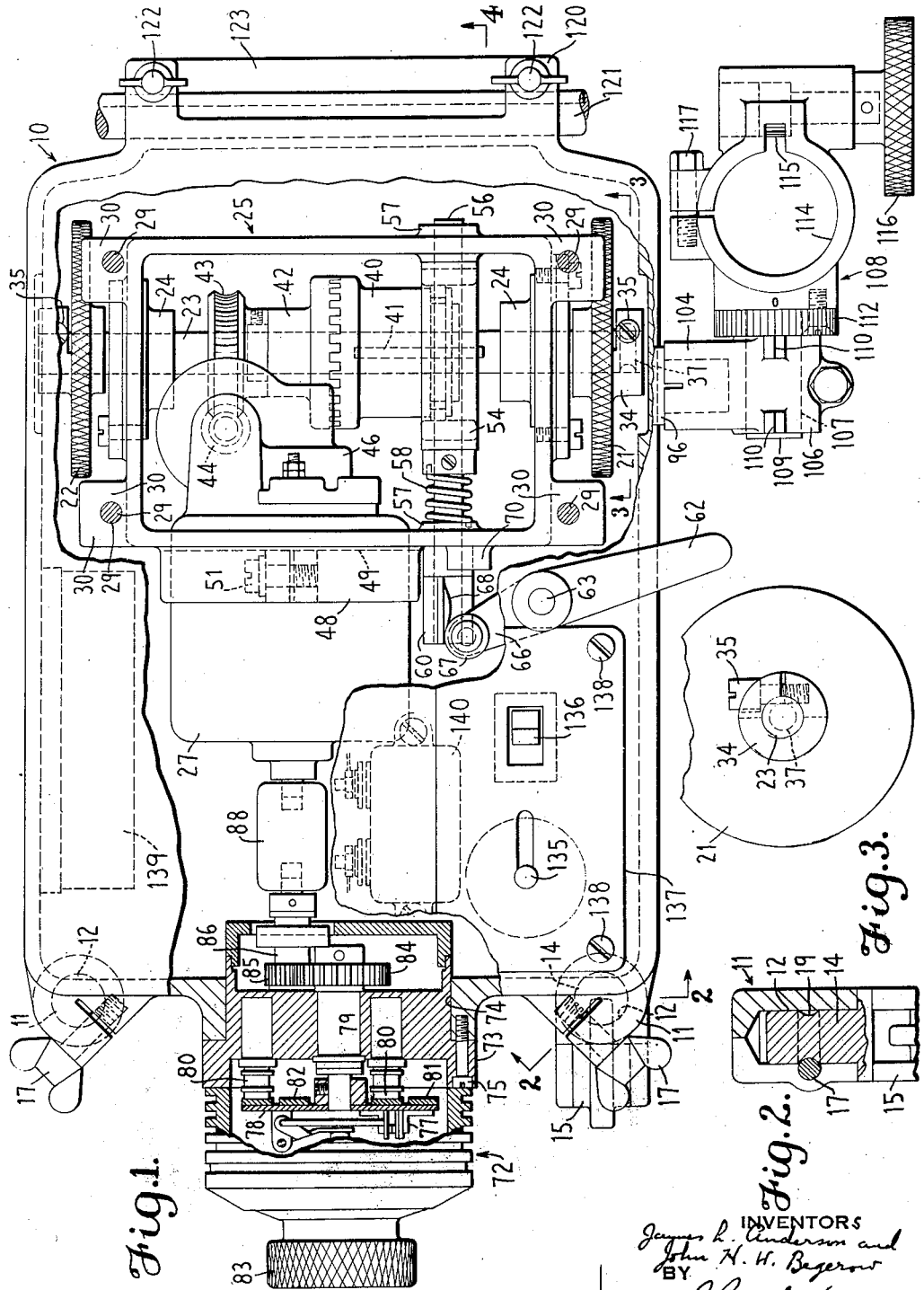

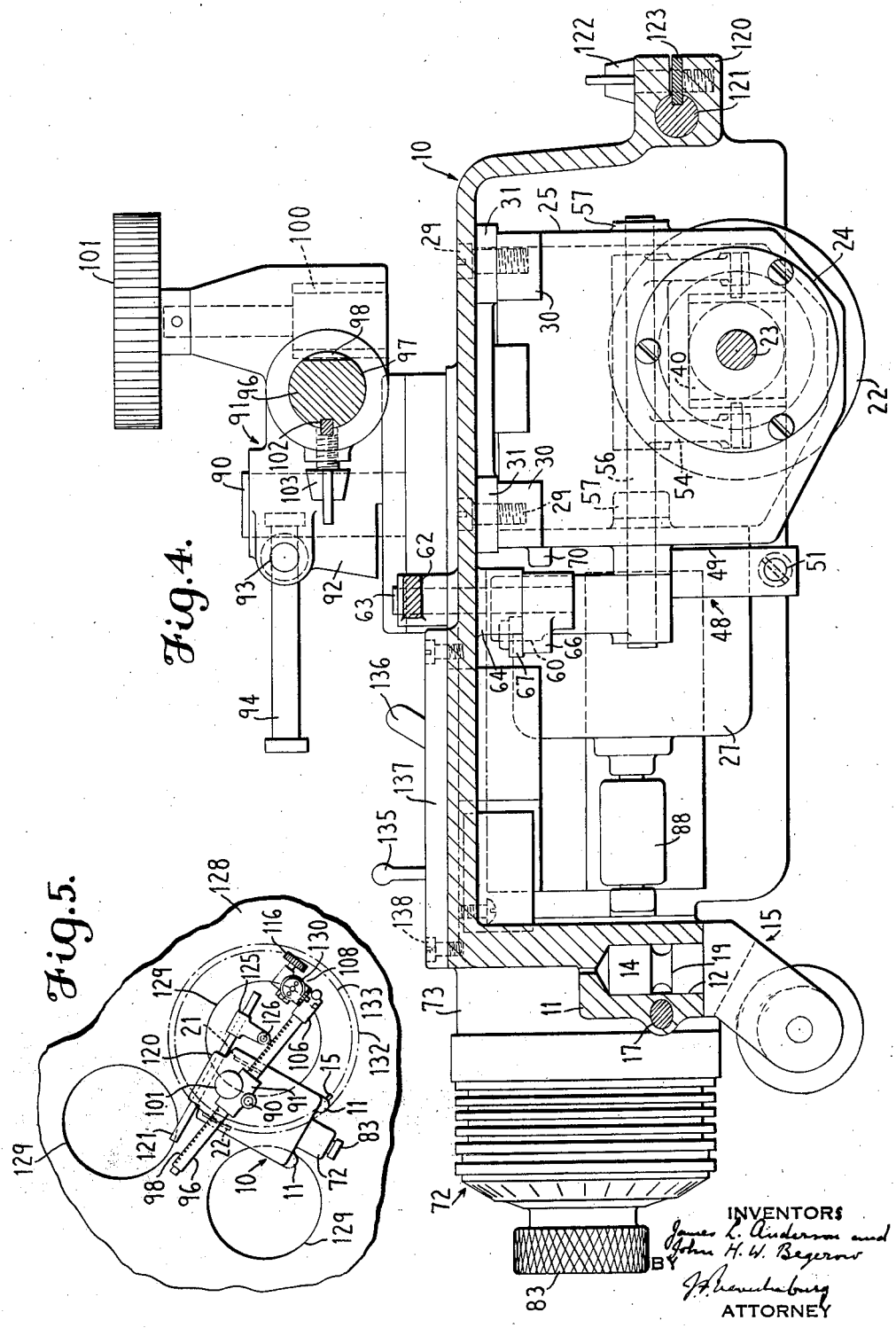

2,266,730

UNITED STATES PATENT OFFICE 2,266,730

PORTABLE CUTTING AND WELDING MACHINE

James L. Anderson, Closter, and John H. W. Begerow, Carlstadt, N. J., assignors to Air Reduction Company, Incorporated, New York, N. Y., a corporation of New York Application February 17, 1939, Serial No. 256,938

7 Claims. (Cl. 266—23)

This invention relates to cutting and welding apparatus in which a self-propelled carriage running on the work, track, or other surface supports a torch and moves it along a desired course at a uniform speed.

It is an object of the invention to provide a self-propelled torch carriage having a novel construction and combination of elements that make the apparatus more economical to manufacture and repair and more advantageous in use.

In torch carriages of the character indicated it has been customary to provide the carriage with an electric motor having a centrifugal governor attached to the motor housing and driven directly from the armature shaft of the motor, and forming with the motor a single structural unit. One feature of this invention relates to the separation and independent connection with the carriage body of the motor and governor in such a manner that either of them can be removed for repair or replacement without removing the other, and the governor can be run at less than motor speed, thereby decreasing the wear on the governor and increasing the length of its useful life.

Other features of the invention relate to the driving mechanism which comprises a complete transmission unit detachably secured to the body of the carriage with the motor connected to and preferably a part of the transmission unit.

Other objects, features and advantages of the invention will appear or be pointed out as the specification proceeds.

In the accompanying drawings, forming part hereof:

Fig. 1 is a top plan view, partly broken away and partly in section, showing a portable cutting and welding machine embodying this invention.

Fig. 2 is a sectional view, taken on the line 2—2 of Fig. 1.

Fig. 3 is an end view of the driving axle and one wheel, this view being taken on the line 3—3 of Fig. 1.

Fig. 4 is a sectional view taken on the line 4—4 of Fig. 1.

Fig. 5 is a reduced plan view showing the manner in which the invention is used to perform a special cutting operation.

Figure 6:
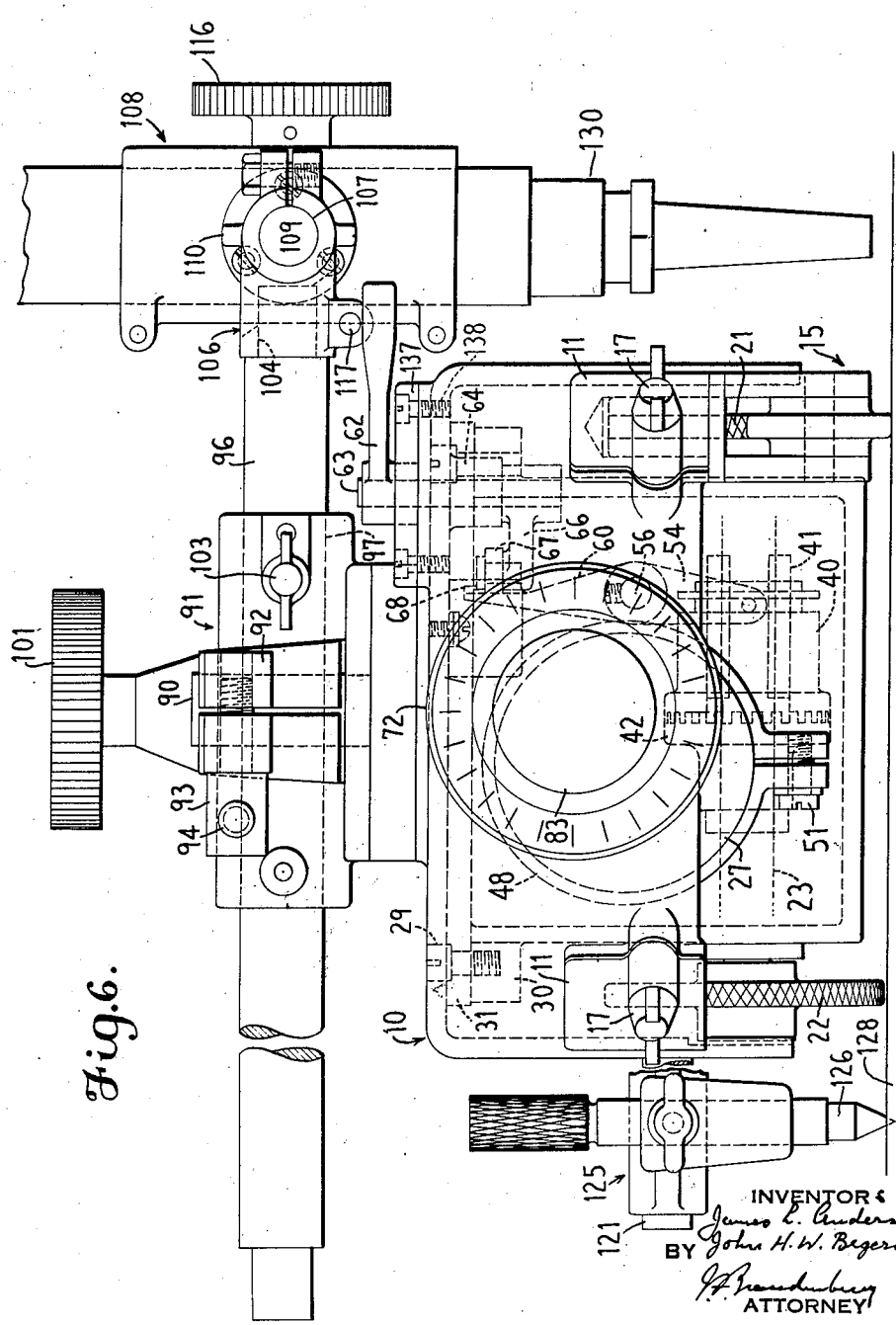
Fig. 6 is an end view of the machine shown in Figs. 1 and 4.

The machine shown in the drawings comprises a carriage having a body or frame 10, which is preferably a box casting open at the bottom. The body has lugs 11 on both sides at its rearward end. Each of these lugs has a downwardly opening socket 12 for receiving a pintle 14 of a caster 15. There may be a caster on each side of the body or only on one side, and preferably the torch side as shown in Fig. 1. One advantage of a single caster wheel with two traction wheels is that the three-point support causes both of the traction wheels to touch the supporting surface at all times, but with four wheels different ones fail to touch the supporting surface at different times. One advantage of shifting the third point of support will be explained in connection with Fig. 5.

Each of the lugs 11 is split through on one side and has a clamping screw 17 which can be tightened to cause the socket 12 to grip the pintle 14 and hold it against swivel action when desired. A portion of the clamping screw 17 extends into the socket 12, as shown in Fig. 2, and passes through an annular recess 19 in the pintle 14 so that the pintle is held in the socket when the clamping screw is released and the caster is free to swivel.

Referring again to Fig. 1, the front end of the carriage body is supported by wheels 21, 22 on opposite ends of an axle 23 journaled in bearings 24 in a housing 25. This housing comprises the transmission case of the machine and carries the driving motor 27. The transmission case 25 with its enclosed mechanism, the motor 27, and wheels 21, 22 forms a complete assembly unit that can be detached from the carriage body 10.

There are four screws 29 extending through the top wall of the carriage body 10 and threading into lugs 30 on the transmission case 25 (Fig. 4) and holding the case firmly against pads 31 on the under side of the top wall of the carriage body.

The wheel 21 has a hub 34 on one side split to form a clamp. A screw 35, best shown in Fig. 3, is used to clamp the hub 34 against the axle 23. When the clamping screw 35 is loosened, the wheel 21 is free to turn on the axle 23, but it is held against longitudinal movement on the axle by the clamping screw 35 because that screw is so located that one side of it extends into an annular recess 37 in the axle 23.

The construction of the wheel 22 is similar to that of the wheel 21, and the screw by which the hub of wheel 22 can be clamped to the axle is indicated by the reference character 35 in Fig. 1. When the wheels 21, 22 are turned into positions with the heads of the screws 35 downward, these screws are readily accessible from below the carriage body and they can be turned with a screwdriver or wrench to make the wheels either fast or loose on the axle 23. Since the axle is driven by power through transmission mechanism that will be described, the screws 35 provide means by which either or both of the wheels 21, 22 can be made to supply tractive effort to the carriage. For most work it is desirable that both of the wheels 21, 22 serve as traction wheels, but in circle cutting or welding, where the machine is used with a radius rod and a fixed center, an advantageous control of the torch speed can be had by choosing as the driving wheel the one closer to or further from the center of rotation.

A movable clutch member 40 (Fig. 1) can shift longitudinally on the axle 23 but is prevented from turning on the axle by a spline or key 41. The jaws of the clutch member 40 engage with complementary jaws of a fixed clutch member 42 connected with a worm-wheel 43 and freely rotatable as a unit with the worm-wheel on the axle 23.

The worm-wheel 43 is driven by a worm 44 at the low-speed end of a reduction gear unit 46. This reduction gear unit is fastened to the frame of the electric motor 27, and is driven from the shaft of the motor.

A short sleeve 48 extends from the rearward wall of the transmission case 25. The bottom semi-circle of this sleeve is separate from the wall of the case, the clearance being indicated by the reference character 49 in Fig. 4, and is split and provided with a clamping screw 51. This construction makes the bottom part of the sleeve in effect a clamping band, and the sleeve comprises a holder for the motor 27.

The reduction gear end of the motor is inserted through the sleeve or holder 48 until the worm 44 (Fig. 1) engages the worm-wheel 43. The screw 51 is then tightened and the motor is firmly held with the worm in driving relation to the worm-wheel 43. If the motor 27 has to be removed for repairs, or is to be replaced by another motor, the screw 51 is released and the motor is withdrawn from the sleeve 48. The worm 44 pulls away from the worm-wheel. Thus, the only fastening that need be moved in order to remove the motor is the screw 51.

The movable member 40 of the clutch is shifted longitudinally on the axle 23 by a yoke 54 that is fastened to a shaft 56 journaled in bearings 57 in the housing 25. A spring 58 tends to turn the yoke in a direction to cause the jaws of the clutch member 40 to engage the complementary jaws of the clutch member 42.

The end of the shaft 56 extends beyond the back wall of the housing 25 and has a crank 60 (Fig. 6) that extends upward. A clutch-operating handle 62 on top of the carriage body is connected to the upper end of a shaft 63 that turns in a bearing 64 in the top wall of the carriage body. A crank 66 on the lower end of the shaft 63 carries a roller 67 which contacts with a cam surface 68 at the upper end of the crank 60 and transmits angular movement of the clutch-operating handle 62 to the shaft 56 and yoke 54. The cam face 68 has a high point, shown in Fig. 1, and when the handle 62 has been shifted far enough to move the roller 67 beyond the high point on the cam, the crank 66 comes against an abutment 70 and the clutch is held disengaged, to permit free wheeling.

A governor 72 has a body 73 that fits into an opening 74 in the back wall of the carriage body 10. The governor is detachably fastened to the carriage by screws 75 that pass through a part of the governor body and thread into the carriage body.

The centrifugal switch mechanism designated generally by the reference character 77 is carried on a disc 78 on a shaft 79 which is rotated at a speed proportional to the speed of the motor. Current flows to and from the centrifugal switch mechanism through brushes 80 that are spring-pressed against slip rings 81, 82 on the front side of the disc 78 which is of insulating material. The governor is adjusted by a calibrated control knob 83 to open the circuit at different speeds. No further description of the governor circuit and switch mechanism is necessary for a full understanding of this invention. Such a governor is described in detail in Patent No. 2,032,743, dated March 3, 1936.

The shaft 79 has a large gear 84 at its forward end. This gear meshes with a smaller gear 85 on a shaft 86 that is driven from the motor 27 through a coupling 88. The gears 84, 85 cause the governor to run at a slower speed than the motor, and thereby reduce wear on the governor bearings and prolong the length of time that the governor remains reliable and useful. If desired, the governor can be run at the same speed as the motor, or at a higher speed for greater sensitivity.

The coupling 88 is preferably rubber with alined sockets at opposite ends shaped to receive non-circular ends of the shaft 86 and the motor shaft. The ends of these shafts are far enough apart so that the coupling 88 can be compressed beyond the end of either shaft and then moved sideways clear of the shaft to remove the coupling without disturbing any other parts of the machine. The distance between the ends of these shafts is preferably enough to allow the motor 27 to be pulled out of the sleeve 48 without displacing the governor and its forwardly projecting shaft 86.

A post 90 (Fig. 6) extends upward from a boss on the top of the carriage body. A torch arm holder 91 has a split clamp 92 that fits around the post 90 and is clamped to the post by a screw 93 that is turned by a handle 94.

A torch arm 96 extends through a horizontal opening 97 (Fig. 4) in the holder 91. The arm 96 is of circular cross-section with a rack 98 cut in one side and a longitudinal keyway in the opposite side. A pinion 100 meshes with the teeth of the rack 98, and is turned by a knob 101 to move the torch arm lengthwise in the opening 97. A key 102 fits into the keyway in the torch arm and prevents the torch arm from turning about its axis. Screws 103 cause the key 102 to move toward or from the torch arm 96 and thus control the friction between the torch arm and the key. It is desirable to have enough friction to hold the torch arm in any set position.

Both ends of the torch are cylindrical and of reduced diameter, as shown in Fig. 6. These ends fit a clamp socket 104 at one side of a connecting clamp 106. There is another clamp opening 107 extending at right angles to the socket 104 in the connecting clamp 106. A torch-holder 108, best shown in Fig. 1, has a stud 109 that can be inserted into the clamp opening 107 from either end. An index mark 110 at each end of the opening 107 registers with a zero indication on the torch-holder when a torch carried by the holder is in a vertical position, and there is a scale of graduations 112 on the torch-holder for indicating angular inclination of the torch for bevel cutting.

There is an opening 114 in the torch-holder for receiving the torch, and a pinion 115 operated by a knob 116 cooperates with the conventional rack on the side of the torch to raise and lower the torch in its holder. The torch-holder 108 is split and provided with the usual clamping screw 117 for regulating the friction of the torch in the opening 114.

At the front end of the carriage there are lugs 120 with alined openings through which a radius rod 121 can be inserted when the apparatus is to be used for circle cutting or welding. The lugs 120 are split at their front ends and have clamping screws 122 by which they can be made to grip the radius rod 121. A narrow plate 123 extends all the way across the front of the carriage between the lugs 120 and into the split of each of these lugs as shown in Fig. 4. The clamping screws 122 extend through the plate 123 to hold it against displacement. The rearward edge of the plate 123 fits into a keyway in the radius rod 121 to keep the radius rod from turning when not clamped by the lugs 120. The thickness of the plate 123 is not enough to prevent the lugs from clamping the radius rod. The front end of the body casting serves as a handle for picking up the carriage.

When the apparatus is used with the radius rod 121 for cutting circles, a center holder 125 (Fig. 6) is clamped to the radius rod. A center 126 threads through the holder 125 and has a point at its lower end for engagement with a center punch mark on the work 128 or other supporting surface over which the machine operates. Fig. 6 shows the center 126 screwed down far enough to lift the wheel 22 clear of the work. A portion of the weight of the carriage is, therefore, supported by the center 126.

Fig. 5 shows the manner in which the invention can be used when cutting a plurality of holes in a plate. In the case illustrated the work 128 has two holes 129 already cut through it, and the torch 130 is cutting a third hole, the outline of which is also indicated by the reference character 129.

The torch arm 96 is movable into any angular position with respect to the carriage body by releasing the clamp of the torch arm holder 91 and turning the holder about the post 90. The torch arm holder 91 can be turned on the post 90 to change the torch from one side of the carriage to the other. In Fig. 5 the torch arm holder is turned enough to bring the point at which the torch jet strikes the work on a line that passes through the center 126 and the point of traction of the wheel 22. In Fig. 5 the wheel 21 is raised out of contact with the work by the center 126.

There is a caster 15 on the right side of the carriage, but none on the left. This gives the carriage three-point support. The paths followed by the traction wheel 22 and the trailing caster 15 are indicated by the circles 132 and 133, respectively, in Fig. 5. The caster follows almost the same path as the traction wheel. If there were any caster on the left side of the carriage it would run off the work and into one of the holes 129 when the carriage moved into the position shown in Fig. 5. However, in cutting holes of different size, and with a different position of the center, a caster on the left side of the carriage, instead of the right, might be more advantageous.

Motor controls including a start and stop switch 135 and a reversing switch 136 are connected with a panel 137 and the wires can be connected with these switches to form a complete assembly unit before the panel is connected to the carriage body by the screw fastenings 138. A resistance coil 139 and condenser 140 are shown in the drawing connected to the inside wall of the body casting. The electric circuits for the motor and governor are not shown, however, such circuits being well known in the art and unnecessary to a complete understanding of the invention.

The circle cutting of Fig. 5 is only one of many operations which this invention can be used to perform, and only one embodiment of the invention has been illustrated and described. It will be understood, however, that other embodiments of the invention can be made and that some features of the invention may be used without others without departing from the invention as defined in the claims.

We claim:

1. A machine for cutting or welding of metals, comprising a wheeled carriage for running on a supporting surface, means on the carriage for holding a torch in position over a metal piece to be cut or welded, a motor supported from the carriage and having an armature shaft and driving connections from said armature shaft to one or more of the wheels, a centrifugal governor supported by the carriage independently of the motor, said governor including at least one driving member that is rotatable about an axis extending in the same or a parallel direction to the axis of the armature shaft, and motion transmitting connections between the armature shaft and said driving member of the motor.

2. In a torch carriage for moving a cutting or welding torch at a uniform rate, one or more traction wheels supporting the carriage, an electric motor on the carriage, said motor including an armature shaft, motion transmitting connections including speed reducing gearing between one end of the armature shaft and the one or more traction wheels, a centrifugal governor comprising an assembly unit supported by the carriage independently of the motor and the motor armature shaft including switch means in the motor circuit for controlling the motor speed, and driving connections between the governor and the end of the motor armature shaft remote from said speed reducing gearing for driving the governor at a speed proportional to but different from the motor speed.

3. A self-propelled carriage for moving a cutting and welding torch across a work-piece including a carriage body, wheels stably supporting the carriage on an underlying surface, and mechanism for driving one or more of the wheels including a transmission unit distinct from the carriage body and detachably secured to the carriage body, a motor, and means supporting the motor from the transmission unit, said supporting means including a bearing surface and a clamp that surrounds and grips said bearing surface, one element of the supporting means being on the motor and the other on the transmission unit.

4. A cutting or welding torch carriage comprising a body casting, a power unit within the body casting, but distinct from the body casting and including a housing with an axle extending from both ends, traction wheels on the ends of the axle, a motor, a cylindrical clamp on the housing and into which the motor fits for detachably fastening the motor to the housing, driving connections within the housing for transmitting motion of the motor to the axle, and detachable fastenings connecting the power unit housing to the body casting in a definite relation to said body casting.

5. A portable cutting or welding machine comprising a carriage body, wheels supporting the carriage body including one or more traction wheels, driving connections to the traction wheels including an axle and a gear that rotates the axle, an electric motor having a frame and an armature shaft, a reduction gearing unit secured to the motor frame, and including a low-speed member for engaging said gear, a supporting clamp into which the motor is inserted lengthwise for connecting the motor to the carriage with the armature shaft of the motor in a substantially horizontal position, and means for closing the clamp on said motor to detachably fasten the motor to the carriage body in such position that the low-speed member of the reduction gearing engages with said gear on a side of the gear from which said driving member pulls away when the motor is moved in a direction to withdraw it from the holder.

6. A portable cutting or welding machine comprising a carriage body, wheels supporting the carriage body including one or more traction wheels, mechanism for driving the traction wheels including a motor, a centrifugal governor in the motor circuit for maintaining a constant motor speed, said motor and governor being independently secured to the carriage body with the motor enclosed in the carriage body and the armature shaft of the motor extending from the motor and another shaft extending from the governor in substantial alinement with the motor shaft, and a driving connection between said shafts including a slip coupling that pulls apart longitudinally so that either the governor or the motor can be removed from the carriage body without removing the other.

7. In a self-propelled cutting or welding torch carriage, a motor fitting in a socket in the carriage and a centrifugal governor fitting in another socket in the carriage, means detachably holding the motor and governor fixed in their respective sockets, wheels for the carriage, motion transmitting connections between the motor and one or more of the wheels, and other motion transmitting connections between the motor and governor including a shaft connected with the governor, another shaft extending from the motor and terminating at a substantial distance from the first shaft, and a coupling between the shafts compressible lengthwise of the shafts.

JAMES L. ANDERSON.
JOHN H. W. BEGEROW.